US012774727B2

(12) United States Patent
Zenzen et al.

(10) Patent No.: US 12,774,727 B2
(45) Date of Patent: Oct. 27, 2026

(54) DISK BRAKE FOR A MOTOR VEHICLE WITH OPTIMIZED RETRACTION OF AT LEAST ONE BRAKE PAD

(71) Applicant: ZF Active Safety GmbH, Koblenz (DE)

(72) Inventors: Guido Zenzen, Macken (DE); Paul Wecker, Limburg (DE); Bogdan Draghici, Herschbach (DE)

(73) Assignee: ZF Active Safety GmbH, Koblenz (DE)

( * ) Notice: Subject to any disclaimer, the term of this patent is extended or adjusted under 35 U.S.C. 154(b) by 370 days.

(21) Appl. No.: 18/528,964

(22) Filed: Dec. 5, 2023

(65) Prior Publication Data

US 2024/0200627 A1 Jun. 20, 2024

(30) Foreign Application Priority Data

Dec. 16, 2022 (DE) ......................... 102022213763.9

(51) Int. Cl.

*F16D 65/18* (2006.01)
*F16D 65/00* (2006.01)
*F16D 55/22* (2006.01)

(52) U.S. Cl.

CPC ......... *F16D 65/18* (2013.01); *F16D 65/0037* (2013.01); *F16D 65/0068* (2013.01)

(58) Field of Classification Search

CPC .......... F16D 65/18; F16D 65/00; F16D 65/14; F16D 65/0037; F16D 65/0068; F16D 65/38; F16D 55/22

See application file for complete search history.

(56) References Cited

U.S. PATENT DOCUMENTS 3,827,535 A * 8/1974 Hoffman ............. F16D 55/2255 188/138
6,250,437 B1 * 6/2001 Wang ......................... B62L 1/00 188/72.5

(Continued)

FOREIGN PATENT DOCUMENTS

DE 102008037720 A1 2/2010
EP 4063683 A1 9/2022
FR 3031155 B1 7/2018

*Primary Examiner* — Tan Q Nguyen

(74) *Attorney, Agent, or Firm* — Kristin L. Murphy

(57) ABSTRACT

The disclosure relates to a disk brake comprising a brake caliper, a brake carrier that supports the brake caliper, a brake disk couplable for conjoint rotation with a vehicle wheel, a first brake pad and a second brake pad between which the brake disk is mounted. The brake pads are each spaced apart from the brake disk by a retraction force. A brake piston is connected to a pressure source. The brake piston is sealingly displaceably guided in the brake caliper of the disk brake in order to effect a relative movement between the respective brake pad and the brake disk by an applied force provided by the pressure source, so that the brake pads can be brought into contact with the brake disk. An electromagnet having a coil and a coil core movably arranged in the coil is also provided. The coil core is connected to at least one of the brake pads, for example to the second brake pad arranged on a side of the brake disk that is remote from the brake piston to generate the retraction force acting on the at least one brake pad. The coil is connected to the brake carrier.

15 Claims, 9 Drawing Sheets

(56) References Cited

U.S. PATENT DOCUMENTS

| | | | | |
|---|---|---|---|---|
| 2009/0008193 | A1 * | 1/2009 | Sekiya | F16D 65/095 188/73.31 |
| 2015/0107943 | A1 | 4/2015 | Yokoyama et al. | |
| 2018/0001878 | A1 * | 1/2018 | Thomas | H02K 7/14 |
| 2018/0013332 | A1 * | 1/2018 | Al-Mahshi | F16D 65/22 |
| 2023/0175564 | A1 * | 6/2023 | Gerber | B60T 8/17613 |
| 2023/0228304 | A1 * | 7/2023 | Van De Vorst | F16D 65/543 188/72.3 |

* cited by examiner

DISK BRAKE FOR A MOTOR VEHICLE WITH OPTIMIZED RETRACTION OF AT LEAST ONE BRAKE PAD

CROSS-REFERENCE TO RELATED APPLICATION

This application claims priority to German Priority Application No. 102022213763.9, filed Dec. 16, 2022, the disclosure of which is incorporated herein by reference in its entirety.

TECHNICAL FIELD

The disclosure relates to a disk brake for a motor vehicle, to a motor vehicle comprising the disk brake, to a method for adjusting an air gap in such a disk brake, and to a device for adjusting an air gap in such a disk brake.

BACKGROUND

The retraction of a brake pad of a floating caliper brake is known in the prior art. For example, the inner brake pad arranged on the brake piston side is separated from the brake disk by a resilient brake piston seal after the brake has been released, whereby a so-called air gap between the brake disk and the inner brake pad is adjusted in order to reduce unnecessary fuel consumption and brake wear.

On the outer side of the brake, thus in a region in which the wheel rim is mounted, the outer brake pad is generally retracted by springs in order to adjust the air gap. The retraction forces must be higher on the outer side than on the inner side, because not only must the outer brake pad overcome the frictional forces in the brake pad guide, but the floating caliper as a whole must also be moved.

FR 3 031 155 B1, which corresponds to the generic type in question, relates to a system for actively retracting brake pads. To this end, an actuator in the form of a solenoid, for example, can be fastened to the sliding bearings of a disk brake with floating mounting or to the rear side of one or more brake pads.

It is a disadvantage in the known systems that the conventional retraction mechanisms based on pad retracting springs have only low retraction forces of 20-30 newtons. These retraction mechanisms are thus not able to robustly retract the housing over the lifetime of a brake. As the amount of dirt increases, the spring force is no longer sufficient to enable the pads to be retracted. Furthermore, the springs are not able to center the housing relative to the disk. Such centering is necessary for robust retraction because, when the disks are deflected as the motor vehicle travels round a bend, the brake caliper is displaced. A further disadvantage consists in that the air gap changes over time as a result of wear of the brake pad and of the brake disk. For example, the air gap is also subject to constant changes while the motor vehicle is in operation, inter alia owing to the changing temperature of the brakes. Furthermore, the individual brakes of a motor vehicle may have significantly different air gaps. Consequently, the individual brakes can have different response times and optionally also different brake forces, as a result of which the center of gravity of the motor vehicle is displaced on braking, for example in emergency braking, and the motor vehicle is destabilized and in some circumstances becomes out of control.

SUMMARY

What is needed is to provide a disk brake for a motor vehicle which has a sufficient retraction force, of, for example more than 100 newtons per brake pad, for example the outer brake pad. The disk brake is to be constructed in a space-saving, or space-optimized, manner. Further, what is also needed is an arrangement for centering the brake caliper with respect to the brake carrier and determining and adjusting a defined air gap in a disk brake.

A disk brake for a motor vehicle, a motor vehicle comprising the disk brake, and a method for adjusting an air gap in such a disk brake, and by a device for adjusting an air gap in such a disk brake is disclosed. Advantageous exemplary arrangements and developments of the disclosure will become apparent from the dependent patent claims.

The disclosure relates to a disk brake for a motor vehicle, comprising a brake caliper, a brake carrier by which the brake caliper is supported, a brake disk which can be coupled for conjoint rotation with a vehicle wheel, a first brake pad and a second brake pad between which the brake disk is mounted, wherein the brake pads are each spaced apart from the brake disk by a retraction force, a brake piston connected to a pressure source, said brake piston being sealingly displaceably guided in the brake caliper of the disk brake in order to effect a relative movement between the respective brake pad and the brake disk by an applied force provided by the pressure source, so that the brake pads can be brought into contact with the brake disk, and an electromagnet having a coil and a coil core movably arranged in the coil, wherein the coil core is connected to at least one of the brake pads, for example to the second brake pad arranged on a side of the brake disk that is remote from the brake piston, in order to generate the retraction force acting on the at least one brake pad, wherein the coil is connected to the brake carrier of the motor vehicle.

The disk brake can be designed as a floating caliper brake. Correspondingly, the brake caliper, which is attached to or supported by the brake carrier, can be in the form of a floating caliper or fist-type caliper.

There can be used as the pressure source for the brake piston a conventional electromechanical or hydraulic pressure source. In one exemplary arrangement, a pressure source is provided for each disk brake of a motor vehicle. In one exemplary arrangement, a further pressure source is provided as a redundancy. The brake piston is attached by way of the brake carrier to a rear side of the inner, first brake pad (or the brake pad that faces the brake piston) and can be moved directly by actuation of the pressure source.

In conventional disk brakes, the rear side of the outer, second brake pad (or the brake pad that is remote from the brake piston and faces the wheel rim) is displaceably mounted so that, on braking of the motor vehicle, the first brake pad, which is moved first directly by the brake piston, is brought into contact with the brake disk. In response thereto, the brake disk can be brought indirectly into contact with the second brake pad by a relative movement, for example displacement, of the brake caliper. In the case of the disk brake described herein, the outer or second brake pad can be moved both indirectly and directly by way of an actively performed retraction. Retraction here relates to a spatial removal or withdrawal from the brake disk to form an air gap. Retraction is made possible by an electromagnet which comprises a coil (for example solenoid) and a coil core arranged therein. The coil core comprises a ferromagnetic material or has been produced from such a material. Energization of the coil effects a translational movement of the coil core present in the coil along the longitudinal axis of the coil core. The coil core has sufficient play in the coil. The relative movement can be a displacement. Energization of the electromagnet can be activated by means of an electronic control unit (ECU) installed in the vehicle.

Within the scope of the present disclosure, the translational movement imparted to the coil core is used to the effect that the coil core is attached, optionally by way of a backing plate or further components, to the rear side of the second brake pad and is movably accommodated in the coil. The coil is fastened to the brake carrier of the disk brake. By actuation of the coil, the coil core, and thus the brake pad, can be moved linearly, whereby a distance of the second brake pad from the brake disk is made larger. A movement, imparted by the coil, of the second brake pad in the opposite direction, that is to say in the direction toward the brake disk, can be used, for example, for a cleaning operation. Active braking mediated by the coil may not be provided.

The air gap between the second brake pad and the brake disk can thus be adjusted. The air gap should be sufficiently large to at least limit, or where possible completely avoid, undesirable residual slip torques at the brake surfaces and the resulting loss of speed. On the other hand, the air gap should be as small as possible, in order to allow the motor vehicle to be braked quickly if required. For example, a driver assistance system of the motor vehicle can be adapted to adjust the air gap within the context of a detected traffic situation. In one exemplary arrangement, the detected traffic situation is weighted on the basis of a necessity for initiation of a braking operation.

In this way, it is possible to obtain a disk brake for a motor vehicle which provides a sufficient retraction force, for example and preferably of more than 100 newtons, per brake pad, for example the outer, second brake pad. Furthermore, in the course of the retraction, the brake caliper is likewise moved into a starting position, whereby the air gap can be adjusted more precisely. Fastening the coil to the brake carrier permits a space-saving, space-optimized arrangement of the disk brake. Guiding the coil core attached to the rear side of the second brake pad through the coil fixedly connected to the brake carrier improves the alignment of the brake caliper. The nature of the connection between the coil and the brake carrier can be a force-based, interlocking and/or direct connection. The coil and the coil core arranged therein can be used directly, by way of inductive measurements, for travel determination, and consequently for determining, for example, the distance of the mid-point of the coil core from the mid-point of the coil. The control unit can be correspondingly programed for travel determination or travel detection. It is thus possible to determine the distance of the second brake pad from the brake disk, whereby other distance sensors may optionally be dispensed with. Moreover, by purposive energization of the coil, the extent of the translational movement can be controlled or limited and thus the air gap can be adjusted to a desired value. In one exemplary arrangement, the length of the coil core is such that wear of the brake pads is taken into account. This can be effected by making the coil core longer than the coil by, for example, at least the amount of the respective friction pad thickness. In one exemplary arrangement, this can be effected by making the coil core longer than the coil at least by the amount of the sum of the respective friction pad thickness and the permissible brake disk wear of a brake disk side of an associated brake disk. In one exemplary arrangement, the coil core is at least 12 mm longer than the coil.

According to one exemplary arrangement, the coil is fastened in a region of an outer structure of the brake carrier (or in the region of a brake carrier outer beam). The coil can be arranged so that it overlaps the outer structure of the brake carrier, for example based on a depth direction (i.e. from the outer side or rim side in the direction of the inner side or brake piston side). The coil is thus at least partly at the same depth as the outer structure of the brake carrier. Alternatively, the coil can be displaced further inward (i.e. toward the brake piston side) relative to the outer structure of the brake carrier or the brake carrier outer beam. The coil can be fastened centrally to the outer structure of the brake carrier, so that it fits into and is accommodated in a so-called finger opening of the brake housing (i.e. an opening formed between two finger segments of the brake caliper). The coil core can be attached at a mid-point of the at least one brake pad, for example of the second brake pad. Fastening the coil in the region of the outer structure of the brake carrier, or the brake carrier outer beam, for example on an outer end face of the brake carrier, permits a space-saving and space-optimized arrangement of the disk brake. In this way, any space-related limitation by protruding components, for example by the coil and/or the core accommodated in the coil, can be reduced. In addition, the electrical connection of the coil is simplified, because the brake carrier is arranged less relatively movably with respect to the vehicle chassis or the vehicle body than, for example, the displaceable brake caliper. Arranging the coil at the mid-point of the brake pad permits uniform retraction of the brake pad. By attaching the coil core at the mid-point of the second brake pad, centering of the brake caliper can be improved. The arrangement of the coil in respect of the brake carrier permits a space-saving, compact construction of the disk brake.

According to one exemplary arrangement, the electromagnet comprises a coil arrangement of a first coil and a second coil, wherein a first coil core movably arranged in the first coil and a second coil core movably arranged in the second coil are attached to the second brake pad, wherein the first coil and the second coil are each connected to the brake carrier and arranged in the region of a brake pad guide of the at least one brake pad, wherein the brake pad guide comprises a guide groove. The brake pad guide is configured to guide both brake pads. The brake pad guide can have two or more arms, or arm structures, between or on which the brake caliper is displaceably arranged, so as to slide along one or more brake pad guides. The one or more brake pad guides, which comprise one or more guide grooves, can be formed either on the brake carrier or on the brake caliper. In one exemplary arrangement, the center axes of the coils are oriented parallel to the direction of extent of the brake pad guide, in such a manner that only a small offset is present. In other words, the direction of extent of the brake pad guide and the center axis of the coil lie on two mutually parallel straight lines which are at a small distance, for example of 20 mm or less, from one another. In another exemplary arrangement, the center axes of the coils coincide with the direction of extent of the brake pad guide, in such a manner that they are arranged on the same straight line. The use of two coils with two coil cores allows the disk brake to be arranged in a manner that is advantageous in terms of space, and also permits an improved and more stable alignment of the brake caliper with respect to the brake carrier. Moreover, a higher retraction force can be used, whereby the lifetime of the disk brake is further increased and a lower outlay in terms of maintenance can generally be achieved. The use of two coils additionally permits more precise centering of the brake disk between the brake pads, or more precise adjustment of the air gap.

According to one exemplary arrangement, the coil core is configured at least in part as a guide pin, which is axially displaceably accommodated in a guide hole of the brake carrier, for example wherein the coil core configured at least in part as a guide pin is arranged between the guide hole and a sealing collar, wherein the sealing collar adjoins a bearing region of the brake caliper and seals with the coil or a coil housing accommodating the coil. In this case too, a first and a second coil, including two coil cores arranged therein, can be used. The sealing collar can adjoin the bearing region of the brake caliper. Locating the coil core(s) in guide holes permits an improved and more stable centered alignment of the brake caliper with respect to the brake carrier. The present arrangement can additionally effectively be sealed or protected against environmental influences, for example against the ingress of water or dirt.

According to one exemplary arrangement, the coil core is integrally connected, preferably adhesively bonded, welded, screwed or staked, to a backing plate of the at least one brake pad. Where the coil core is screwed to the backing plate of the (second) brake pad, the coil core can be provided with an external thread and the backing plate can correspondingly be provided with a threaded hole, for example with an additional counter nut. The coil core is here may be parallel to a surface normal to the backing plate. In this manner, a stable connection of the backing plate to the coil core can be achieved and optionally high retraction forces can be exerted on the second brake pad. More rapid adjustment of a desired air gap can thus be achieved.

According to one exemplary arrangement, cables are let into and/or laid in the brake carrier, and/or cables are laid through bores. The brake carrier can be in the form of a cast carrier with bores and/or channels, in which the cables or lines, for example for controlling the coil, are accommodated. The cables are thus protected against environmental influences. Alternatively, or in addition, cables can be clipped onto the brake carrier.

According to one exemplary arrangement, the disk brake comprises a sensor system which is adapted to determine an air gap between the brake disk and the first brake pad and/or the second brake pad, preferably wherein the sensor system comprises an inductive measuring sensor system, for example based on the coil and the coil core. The sensor system can be in the form of a conventional distance sensor, or current sensor for determining the inductance. Alternatively, the electrical pulse duration at the coil can be correlated with the extent of the translational movement of the coil core, whereby a travel determination is made possible. The extent of the translational movement can also thus purposively be controlled. Alternatively, or in addition to the parameter of the electrical pulse duration, the travel determination and/or the control of the extent of the translational movement can also be effected by way of the parameters of current intensity or voltage. In the case where the translational movement is detected with the coil and the coil core, by way of which the translational movement is also generated, additional sensor components can be dispensed with.

According to one exemplary arrangement, the method for adjusting an air gap in the disk brake described hereinbefore comprises the steps: (a) contacting the first brake pad and the second brake pad with a brake disk arranged therebetween, and (b) adjusting the air gap by controlling the coil in a temporally controlled manner. Steps (a) and (b) allow a defined air gap between the front side of the second brake pad and the brake disk to be adjusted. The air gap can be adapted on the basis of predefined parameters, for example a traffic situation determined by the driver assistance system of the motor vehicle. Thus, for example in the case of a stretch of road with many bends, it is possible by a smaller air gap to take account of more frequent braking before entering a bend. On a motorway with little traffic, for example, the air gap can be adjusted to correspondingly larger values. In this way, rapid braking of the motor vehicle, for example in an emergency, can be achieved, while wear of the brake pads and the energy consumption otherwise remain low.

According to one exemplary arrangement, (b) adjusting the air gap comprises calibration of the air gap. Calibration can be carried out when the motor vehicle is stationary, for example each time the motor vehicle is stationary. Calibration of the air gap is preferably carried out only on the second brake pad, which is here retracted from the brake disk by a distance. For example, an electromechanical pressure source is activated, by the control unit, in order to retract a brake piston connected to the pressure source and a first brake pad attached thereto by a distance which corresponds to the distance by which the second brake pad is retracted. In this way, the air gap of the disk brake can be adjusted or adapted according to the current traffic situation, which is detected by the driver assistance system. Due to the calibration, a defined initial distance between the brake pads and the brake disk, the brake pads and the brake disks of one wheel axle, for example all the wheel axles, of a motor vehicle can be adjusted. As a result, the wheel brakes can be operated simultaneously and with a mutually corresponding brake force. The stability of the motor vehicle during a braking operation can thus be improved, and lurching or swerving of the motor vehicle, for example on full braking, can be avoided.

According to one exemplary arrangement, the method comprises step (c) cleaning the disk brake by control of the electromagnet. An alternating movement of the coil core can here be generated, on the basis of the temporally controlled, activation of the coil, whereby the entire travel path of the second brake pad, and in one exemplary arrangement, of both brake pads, can be cleaned, for example of dust deposits. This cleaning can take place when the motor vehicle is stationary.

In the case of a travel determination or travel detection, referencing can be carried out. Referencing comprises moving the brake pad, and in one exemplary arrangement, both brake pads, to the brake disk, wherein a zero reference is obtained. From this position, the brake pad, together with the coil core, is retracted by way of the time control with a corresponding actuation time and the desired gap between the brake disk and the brake pad is adjusted. In addition, a cleaning mode of the disk brake by a repeated to-and-fro movement of the at least one brake pad outside of driving operation is conceivable.

The control unit, which is installed in the vehicle, for energizing the electromagnet can also be used by carrying out the method according to the disclosure, for adjusting an air gap in a disk brake. The control unit is programmable, for example, the control unit is correspondingly programed for the travel determination or travel detection. The control unit can be implemented in a driver assistance system of the motor vehicle. An adjustment or adaptation of the air gap can thus be carried out on the basis of a traffic situation, for example determined by the driver assistance system.

In one exemplary arrangement, the disk brake is an electromechanical brake. For example, the motor vehicle has a plurality of brakes, wherein the air gap of each of the plurality of brakes is adapted individually or for each axle individually. In the case of an electromechanical brake, the air gap between the front side of the first brake pad and the brake disk can be determined and adjusted precisely on account of the electrical activation. Together with the precise determination or control of the air gap between the front side of the second brake pad and the brake disk, adaptation of the air gap individually or for each axle individually, for example at the front axle and at the rear axle, allows more even braking, such as emergency braking, of a motor vehicle, optionally without any, or with only slight, loss of control by the driver.

The disk brake is part of a braking system of a motor vehicle. The braking system can be an integrated braking system. An integrated braking system is a structural unit which combines a large number of functions in a compact construction. For example, such an integrated braking system comprises a master cylinder, which can be operated by a brake pedal, an additional pressure source, for example a plunger arrangement, which is configured to be electromechanically actuatable, a brake circuit, which connects the hydraulic components together, control valves, which are used to activate the brakes, a control unit for activating the control valves, and/or a fluid reservoir, which provides a supply of fluid. The integrated braking system comprises at least some, and in some exemplary arrangements, all, of the above-mentioned components, for example the braking system comprises the brake. The control valves and the control unit, in conjunction with the pressure source, activate the brakes and provide corresponding driver and braking assistance functions. These driver and braking assistance functions are used inter alia for autonomous or semi-autonomous driving as well as in the case of heavy braking operations.

The braking system comprises a pressure source, a brake and a brake circuit. The pressure source provides a fluid, for example, a brake fluid, for operating the brake. The pressure source is formed by a master brake cylinder. This master brake cylinder can have a single piston or a plurality of pistons. This master brake cylinder can be operated by a driver by way of a brake pedal. In addition to the pressure source, the braking system can have an auxiliary source, which likewise provides a fluid to the brakes in order to provide a brake force. This auxiliary source is preferably in the form of a single-acting or double-acting plunger arrangement. For example, it is electromechanically actuatable by way of an electric motor. In an integrated braking system, the master brake cylinder is uncoupled from the brakes in the operating state and merely represents an input value for a braking action that is to be provided. For example, the master brake cylinder is connected to a pedal force simulator. In normal operation of such an integrated braking system, the auxiliary source usually provides the fluid for carrying out the braking operation. The brake can be in the form of, for example, a disk brake or a drum brake. Advantageously, the braking system has a plurality of brakes. The brake circuit provides the connection between the individual components of the braking system. For example, the brake circuit comprises a plurality of control valves for controlling the flow of fluid to and from the brakes. The brake circuit may advantageously be divided into two or more partial circuits. These partial circuits are hydraulically uncoupled from one another. In addition, the brakes can be arranged so that they are distributed between the partial circuits so that, in the event of a malfunction, for example a leakage, of one of the partial circuits, the other partial circuits continue to be operational. Accordingly, in the event of a failure of one partial circuit, at least one other partial circuit and the at least one brake thereof continues to be operational.

The pressure source and the brake are connected together by way of the brake circuit. Likewise, the auxiliary source and the brake are also connected together by way of the brake circuit. In normal operation, the fluid for the brake circuit and the brake is provided by way of the auxiliary source, wherein in emergency operation the supply of fluid is affected by way of the pressure source. The flow of the fluid to and away from the brake is controlled by way of the control valves of the brake circuit.

According to an exemplary arrangement, the method comprises a driver assistance system which is adapted to provide a first control signal for calibration of the air gap and a second control signal for adaptation of the air gap to the brake.

BRIEF DESCRIPTION OF DRAWINGS

The disclosure will be explained by way of example and in detail hereinbelow with reference to multiple figures, in which.

DETAILED DESCRIPTION

Figure 1A:
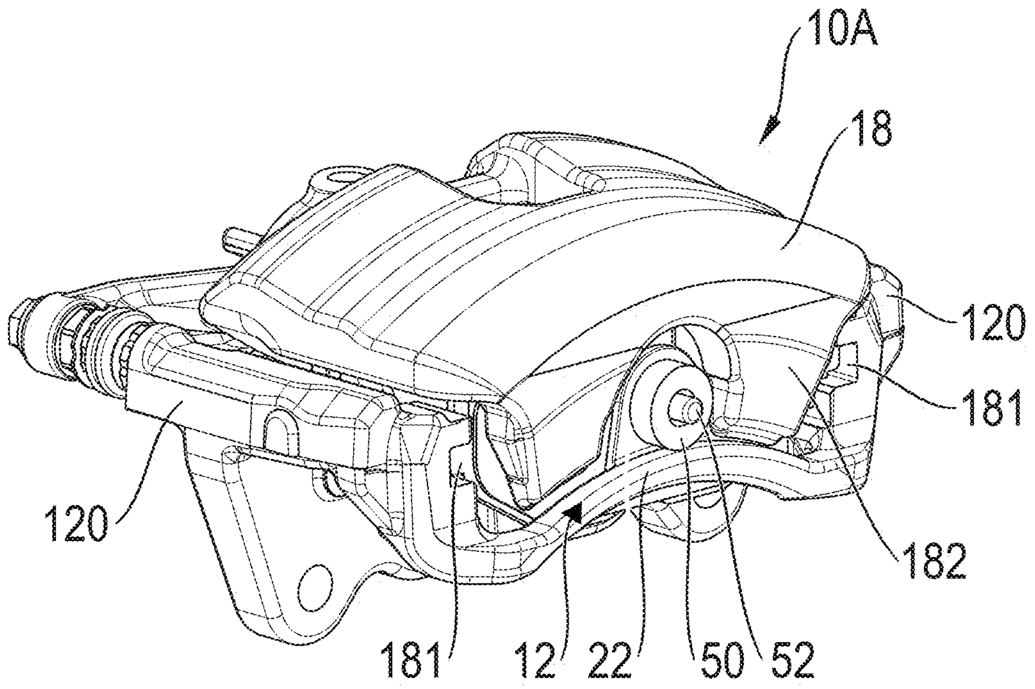
FIG. 1A-C show, schematically, an isometric view (FIG. 1A), a front view (FIG. 1B) and a sectional view (FIG. 1C) of a disk brake according to a first exemplary arrangement in the form of a fist-type caliper brake.
Figure 1B:
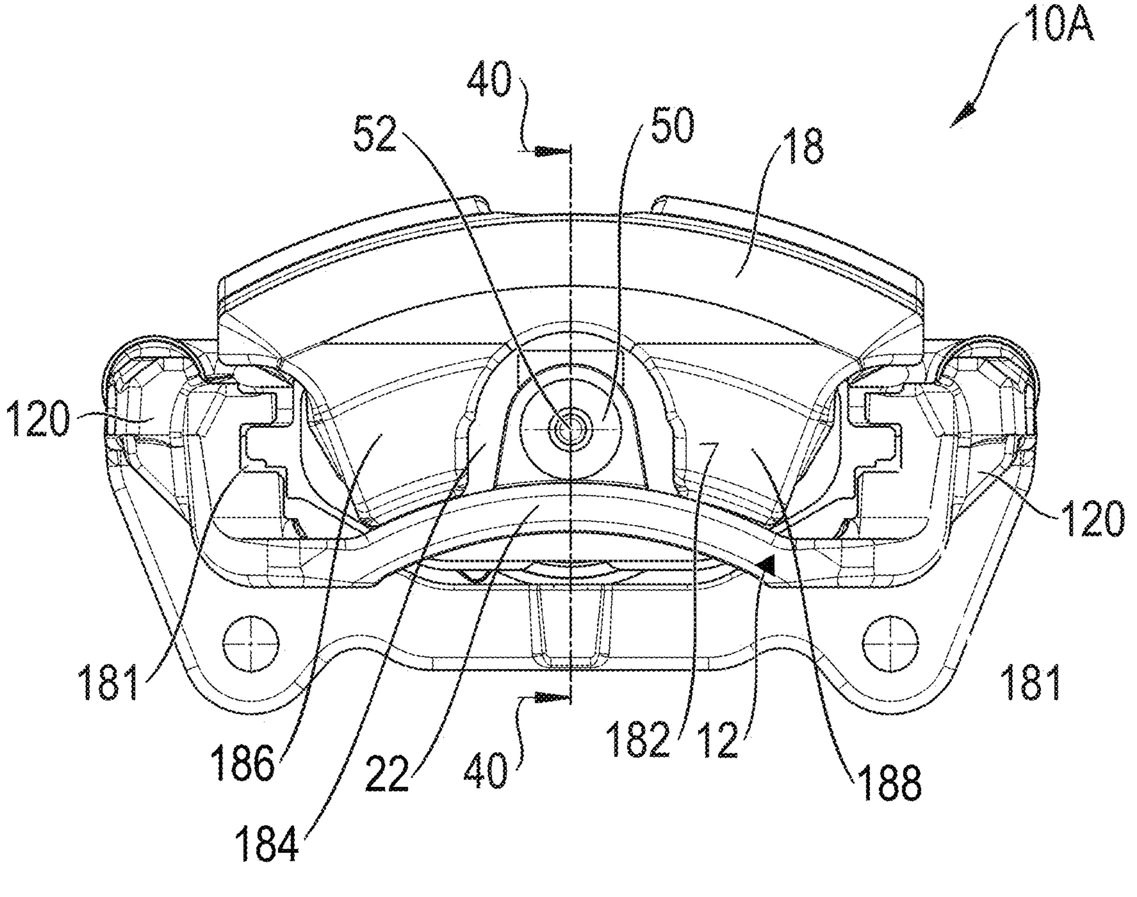

FIG. 1A-B show, schematically, an isometric view and a front view of an example of a disk brake 10A according to a first exemplary arrangement in the form of a fist-type caliper brake.

The disk brake 10A in the form of a fist-type caliper brake has a brake carrier 12 which, in a mounted state of the disk brake 10A, is attached to the motor vehicle (not shown here) and which has an arm structure 120. The arm structure 120 has two mutually parallel brake pad guides 181 in the form of guide grooves, along which there can be moved a brake caliper 18 (here, by way of example, in the form of a fist-type caliper) which is accommodated therebetween and is supported by the brake carrier 12. There can additionally be seen a coil 50 of an electromagnet, said coil being connected to the brake carrier 12 on the front side 182 thereof and thus in a region of an outer structure 22 of the brake carrier 12. As is shown in greater detail in FIG. 1B, the coil 50 is here preferably fastened centrally to the outer structure 22 of the brake carrier 12 in such a manner that it fits into and is accommodated in a finger opening 184 formed by two finger segments 186, 188 of the brake caliper 18. The front side 182 faces a wheel rim (not shown here) of the motor vehicle. A space-saving and space-optimized arrangement of the disk brake 10A, which here, by way of example, is in the form of a fist-type caliper brake, can thus be achieved.

Figure 1C:
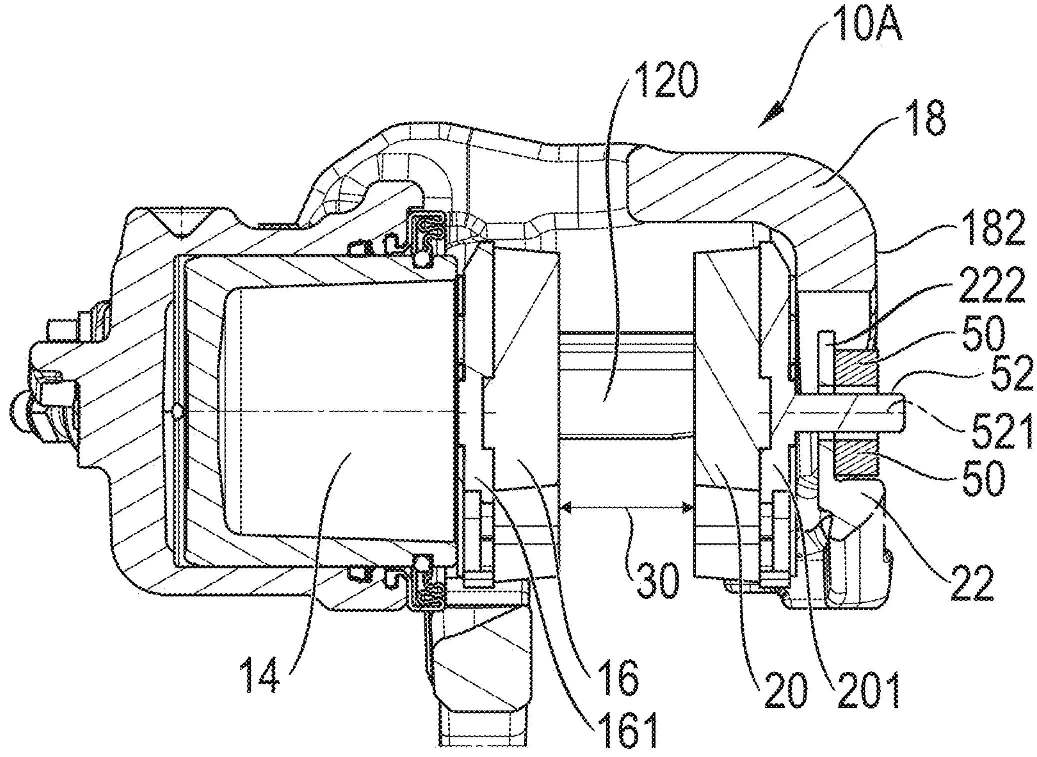

With reference to FIG. 1C, a sectional view along cutting plane 40 from FIG. 1B is shown purely schematically. It is apparent from the sectional view that, in the brake caliper 18, there is a brake piston 14 which is connected to a pressure source. The pressure source is here in the form of an electromechanical pressure source. A first brake pad 16 is connected by way of a backing plate 161 to the brake piston

14 connected to a pressure source. A second brake pad 20 is spaced apart from the first brake pad 16 by a gap 30.

The second brake pad 20 is connected by way of a backing plate 201 to a ferromagnetic coil core 52 of the electromagnet, in such a manner that the coil core 52 is oriented perpendicularly at the mid-point 202 of the second brake pad 20. It is further apparent that the coil core 52 is accommodated in the coil 50 in such a manner that energization of the coil 50 results in a displacement of the coil core 52 along its longitudinal axis 521, wherein the gap 30 between the brake pads 16, 20 becomes larger. The coil core 52 has play in the coil 50, in order to be able to compensate for lateral forces acting on the coil core 52.

As is shown by way of example and schematically in FIG. 1C, the coil 50 is arranged so that, based on a depth direction (i.e. from the outer side or rim side to the inner side or brake piston side), it overlaps the outer structure 22 of the brake carrier 12. This means that the coil 50 is at the same depth as the outer structure 22 of the brake carrier 12. The coil 50 is here arranged, by way of example, on a lug 222 formed integrally with the outer structure 22 of the brake carrier 12. Alternatively, the coil 50 can be displaced further inward (i.e. toward the brake piston side) in the depth direction relative to the outer structure 22 of the brake carrier 12. In this case, the lug 222 can be omitted so as to make the brake disk even more space-saving.

In the gap 30 there is arranged a brake disk (not shown). Operation of the brake piston 14 connected to a pressure source results in the direct displacement of the first brake pad 16 in the direction toward the second brake pad 20 in such a manner that the brake disk is fixed between the brake pads 16, 20 and the vehicle is braked.

Once braking has taken place, the first brake pad 16, by the brake piston 14 connected to a pressure source, and the second brake pad 20, by actuation of the coil 50, are each retracted from the brake disk by a specific distance in order to adjust the air gap. The specific distance can be adjusted by corresponding activation of the electromechanical pressure source and of the coil 50 by a control unit (not shown) of the motor vehicle, in particular a driver assistance system, in order to avoid unnecessary wear of the brake pads 16, 20 and unnecessary energy consumption.

Figure 2A:
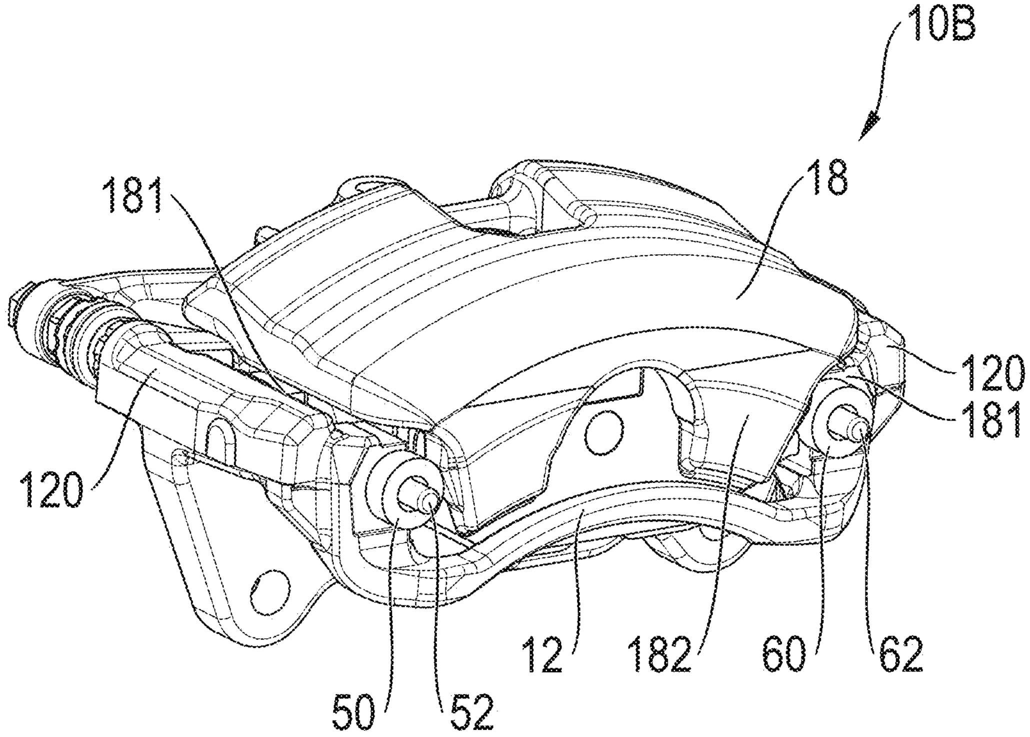
FIG. 2A-C show, schematically, an isometric view (FIG. 2A), a front view (FIG. 2B) and a sectional view (FIG. 2C) of a disk brake according to a second exemplary arrangement in the form of a fist-type caliper brake.
Figure 2B:
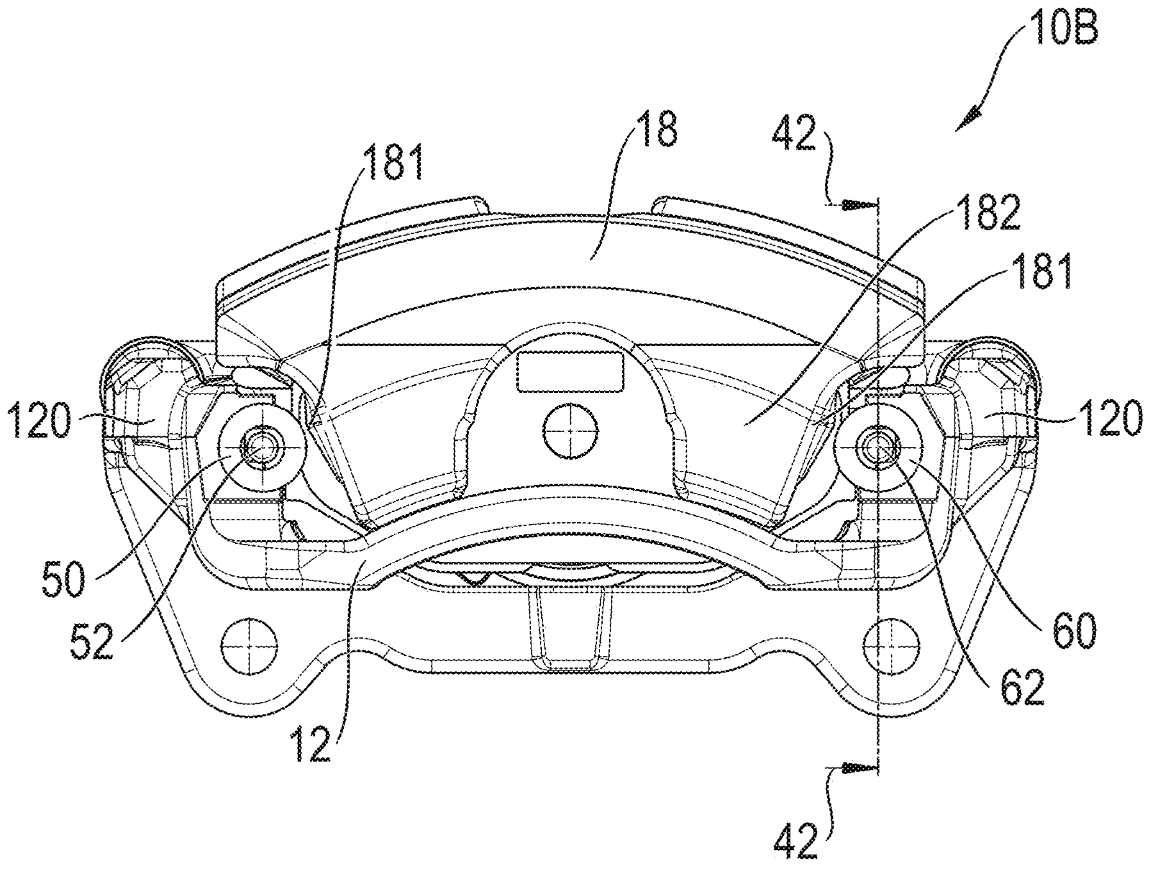
Figure 2C:
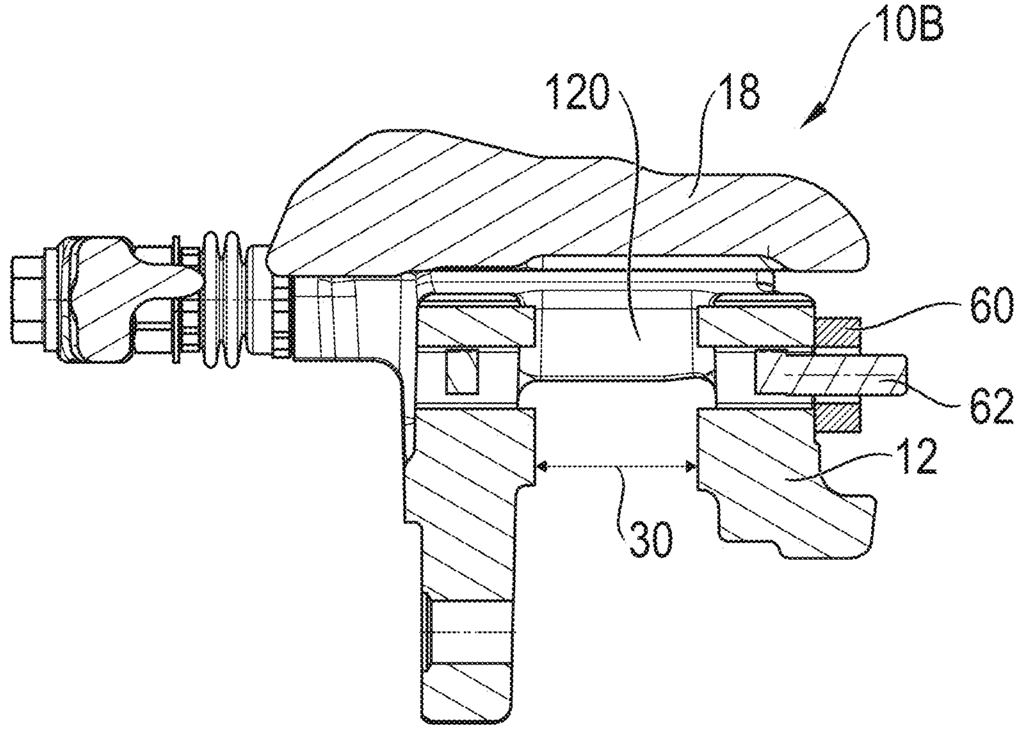

FIG. 2A-B show, schematically, an isometric view and a front view of a disk brake 10B according to a second exemplary arrangement, which by way of example is in the form of a fist-type caliper brake. FIG. 2C further shows, schematically, a sectional view along cutting plane 42 from FIG. 2B.

The second exemplary arrangement differs from the first exemplary arrangement shown in FIG. 1A-C in that, instead of a centrally arranged coil 50 of an electromagnet, two coils 50, 60 each having a coil core 52, 62 are used.

The coils 50, 60 are fastened in a laterally offset manner to the front side 182 of the brake carrier 12 in the region of the arm structure 120 (and in this way are connected to the brake carrier 12), which engages around the brake caliper 18 and between which the brake caliper 18 is arranged so as to be linearly movable in brake pad guides 181 in the form of guide grooves. The two coil cores 52, 62 are likewise arranged perpendicularly on the second brake pad 20 (not shown) and symmetrically relative to the mid-point 202 thereof. It is additionally apparent that the brake pad guides 181 are oriented directly adjoining the coils 50, 60 in such a manner that there is only a slight offset, whereby an improved and more stable alignment of the brake caliper 18 with respect to the brake carrier 12 is obtained. The use of two coils 50, 60 and coil cores 52, 62 additionally permits the use of high retraction forces and an arrangement of the brake disk 10B that is advantageous in terms of space.

Figure 3A:
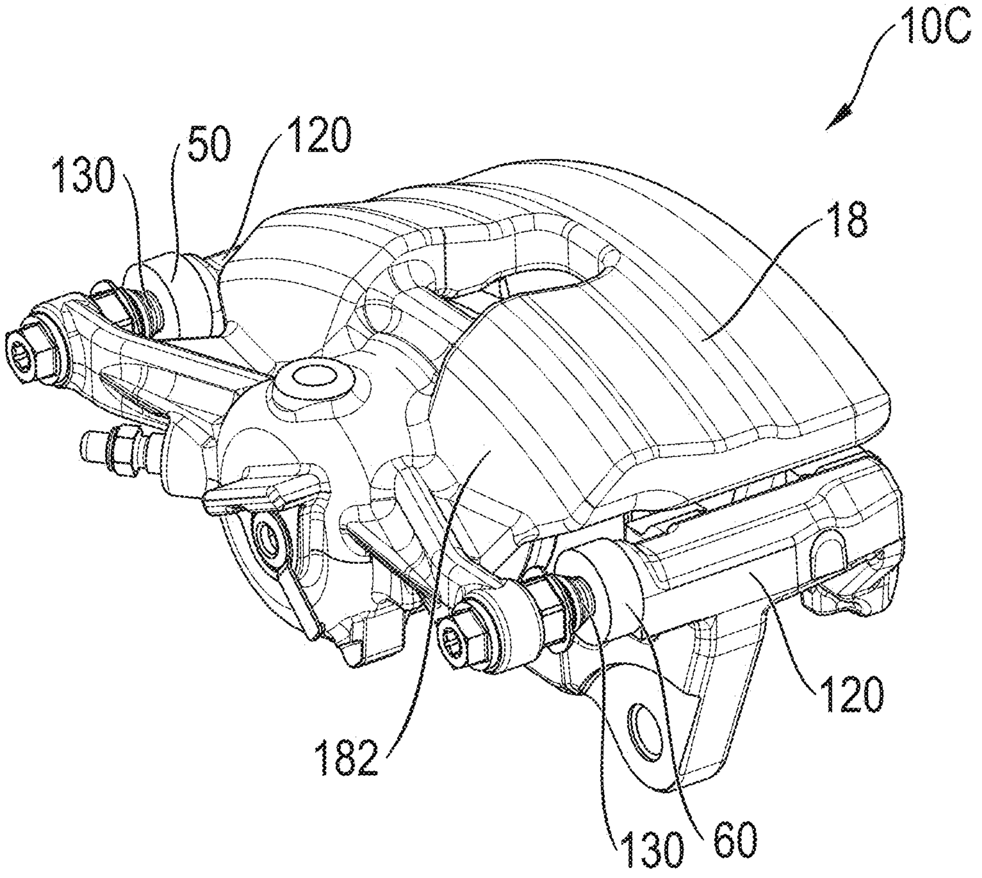
FIG. 3A-C show, schematically, an isometric view (FIG. 3A), a front view (FIG. 3B) and a sectional view (FIG. 3C) of a disk brake according to a third exemplary arrangement in the form of a fist-type caliper brake.
Figure 3B:
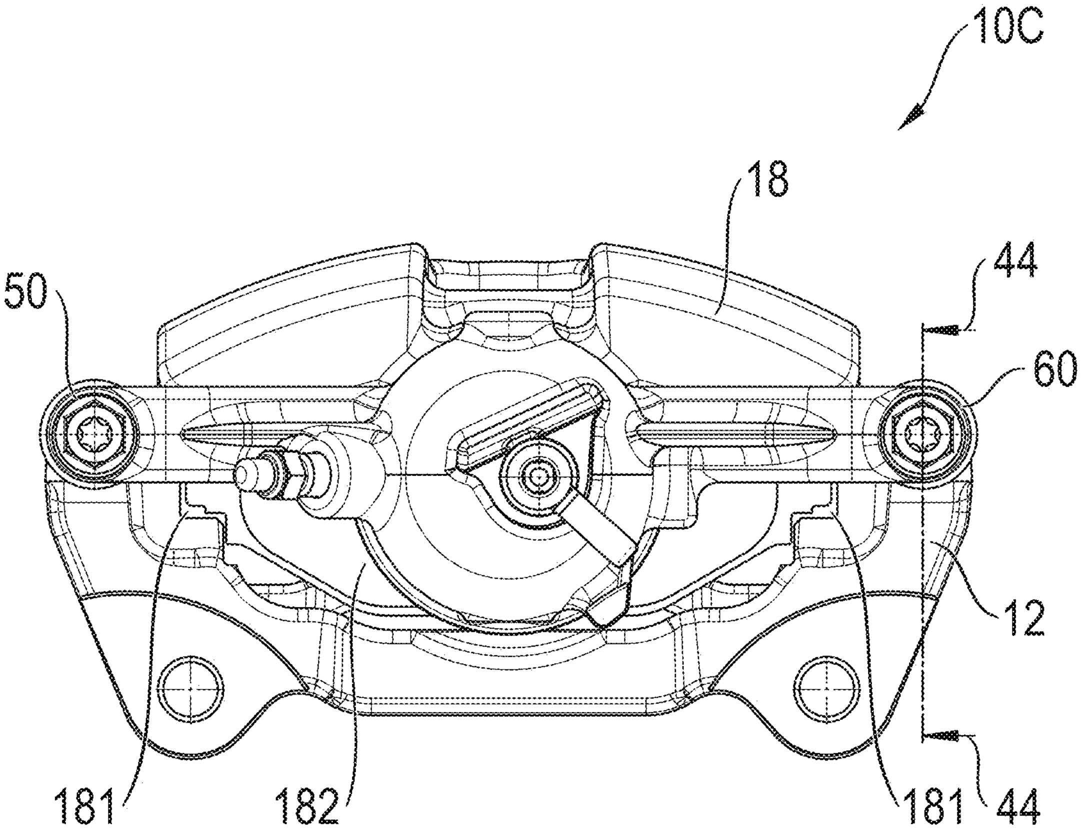
Figure 3C:
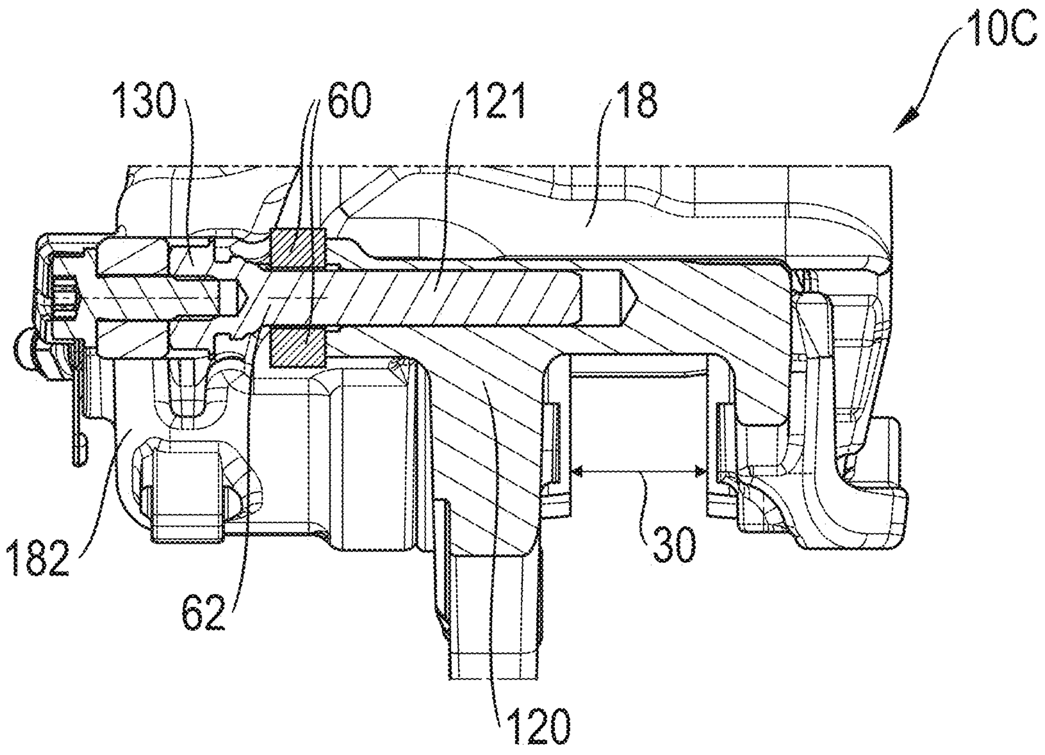

FIG. 3A-B show, schematically, an isometric view and a front view of a disk brake 10C according to a third exemplary arrangement, which by way of example is in the form of a fist-type caliper brake. FIG. 3C further shows, purely schematically, a sectional view along cutting plane 44 from FIG. 3B.

As is apparent from FIG. 3C, the coil 60 adjoins a guide hole 121, in which a coil core 62 in the form of a guide pin and made of a ferromagnetic material is accommodated and can be moved axially by energization of the coil 60. The guide hole 121 is formed parallel to the brake pad guides 181 and is arranged in the region of the arm structure 120. The coil core 62 is connected to the brake caliper 18, to which the second brake pad 20 (not shown) is in turn attached. It is further apparent that the coil core 62 is arranged between the guide hole 121 and a sealing collar 130. The sealing collar 130 adjoins a bearing region of the brake caliper 18 in the brake pad guides 181 and seals with the coil 60.

Locating the coil core in the guide hole 121 permits an improved and more stable centered alignment of the brake caliper 18 with respect to the brake carrier 12. The arrangement of the sealing collar 130 additionally permits effective protection against environmental influences.

As is shown by way of example and purely schematically in FIG. 3A-B, there is provided in addition to the coil 60 and the associated coil core 62 a further coil 50 together with a further coil core 52 in the form of a guide pin. The further coil 50 and the further coil core 52 are configured and fastened to the brake carrier 12 in a corresponding manner to the first coil 60 and the first coil core 62. In this way, both coils 50, 60 are connected to the brake carrier 12. In accordance with the exemplary arrangement shown in FIG. 2A-C, the coil cores 52, 62 are additionally arranged symmetrically with respect to the second brake pad 20 (not shown). Analogously to the exemplary arrangement shown in FIG. 1A-C, it is, however, also conceivable here to use a single coil 50, 60 and a single coil core 52, 62.

Figure 4:
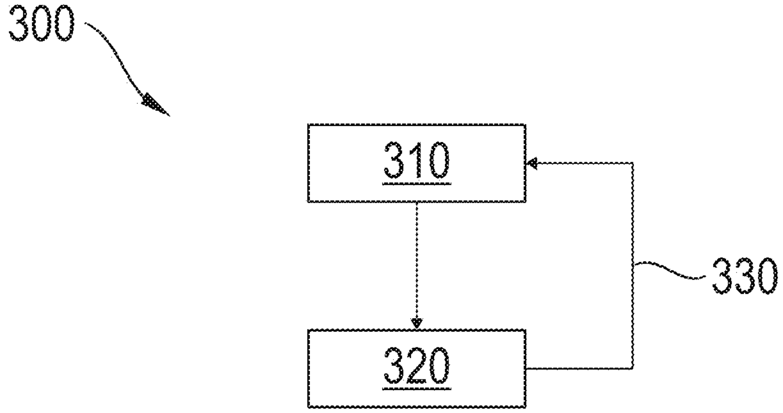
FIG. 4 shows a schematic representation of a method for adjusting an air gap in a disk brake.

FIG. 4 shows a schematic representation of a method 300 for adjusting an air gap in the disk brake 10A-C.

The method 300 comprises contacting 310 the first brake pad 16 and the second brake pad 20 with a brake disk arranged therebetween, and adjusting 320 the air gap by controlling the coil 50, 60 in a temporally controlled manner.

In the step of adjusting 320, a defined electrical pulse is provided by a programmable control unit (ECU) (not shown), which can be implemented, for example, in a driver assistance system, to the coil 50, 60 in such a manner that the coil core 52, 62 and thus the second brake pad 20 attached thereto is retracted by a defined distance.

The control unit can likewise be used to activate an electromechanical pressure source in order to retract a brake piston 14 connected to the pressure source and a first brake pad 16 attached to the brake piston by a distance which corresponds to the distance by which the second brake pad 20 is retracted. In this way, the air gap of the disk brake 10A-C can be adjusted or adapted, and thus also calibrated, according to the current traffic situation, which is detected by the driver assistance system. The comparison, carried out within the scope of the calibration, of the distances between the two brake pads 16, 20 and the brake disk is carried out each time the motor vehicle is stopped. In the calibration of the air gap, the distances of all the wheel brakes of the motor vehicle can be compared with one another, whereby greater stability of the motor vehicle during a braking operation can be achieved. Skidding or swerving of the motor vehicle, for example on full braking, can thus be avoided.

The method can additionally comprise step (c) cleaning (330) the disk brake (10A, 10B, 10C) by way of control of the coil 50, 60. The coil 50, 60 is here repeatedly activated in a temporally controlled manner so that an alternating movement of the coil core 52, 62 over its entire travel path is achieved. Any dirt present on the disk brake 10A-C can thus be at least partially removed.

The invention claimed is:

1. A disk brake for a motor vehicle, comprising:

a brake caliper, a brake carrier by which the brake caliper is supported, a brake disk which can be coupled for conjoint rotation with a vehicle wheel, a first brake pad and a second brake pad between which the brake disk is mounted, wherein the brake pads are each spaced apart from the brake disk by a retraction force, a brake piston connected to a pressure source, said brake piston being sealingly displaceably guided in the brake caliper of the disk brake in order to effect a relative movement between the respective brake pad and the brake disk by an applied force provided by the pressure source, so that the brake pads can be brought into contact with the brake disk, an electromagnet having a coil and a coil core movably arranged in the coil, wherein the coil core is connected to at least one of the brake pads arranged on a side of the brake disk that is remote from the brake piston, in order to generate the retraction force acting on the at least one brake pad, wherein the coil is connected to the brake carrier, and wherein the coil is fastened in a region of an outer structure of the brake carrier, wherein the coil is arranged so that it overlaps the outer structure of the brake carrier or is arranged between the outer structure of the brake carrier and the brake caliper.

2. The disk brake as claimed claim 1, wherein the coil core is configured at least in part as a guide pin, which is axially displaceably accommodated in a guide hole of the brake carrier.

3. The disk brake as claimed claim 2, wherein the coil core configured at least in part as a guide pin is arranged between the guide hole and a sealing collar.

4. The disk brake as claimed in claim 2, wherein the sealing collar adjoins a bearing region of the brake caliper and seals with the coil or a coil housing accommodating the coil.

5. The disk brake as claimed in claim 1, wherein the coil core is integrally connected, to a backing plate of the at least one brake pad.

6. The disk brake as claimed in claim 1, wherein cables are let into and/or laid in the brake carrier, and/or wherein cables are laid through bores formed in the brake carrier, said bores being arranged in the region of a brake pad guide.

7. The disk brake as claimed in claim 1, comprising a sensor system which is adapted to determine an air gap between the brake disk on the one hand and the first brake pad and/or the second brake pad on the other hand, wherein the sensor system comprises an inductive measuring sensor system, based on the electromagnet.

8. A motor vehicle, comprising the disk brake as claimed in claim 1.

9. A device for adjusting an air gap in a disk brake as claimed in claim 1, comprising a control unit which is configured to carry:

a) contacting the first brake pad and the second brake pad with a brake disk arranged therebetween, and b) adjusting the air gap by controlling the electromagnet in a temporally controlled manner.

10. A disk brake for a motor vehicle, comprising:

a brake caliper, a brake carrier by which the brake caliper is supported, a brake disk configured to be coupled for conjoint rotation with a vehicle wheel, a first brake pad and a second brake pad between which the brake disk is mounted, the first and second brake pads each being spaced apart from the brake disk by a retraction force, a brake piston connected to a pressure source and sealingly, displaceably guided in the brake caliper, the brake piston being configured to effect a relative movement between at least one of the first brake pad and the second brake pad and the brake disk by an applied force provided by the pressure source so as to bring the first and second brake pads into contact with the brake disk, an electromagnet comprising a first coil and a second coil, and a first coil core movably arranged in the first coil, and a second coil core movably arranged in the second coil, wherein the first coil core and the second coil core are attached to the second brake pad;

wherein the first coil and the second coil are arranged in a region of a brake pad guide of at least one of the first brake pad and the second brake pad, wherein the electromagnet is configured to generate the reaction force acting on at least one of the first brake pad and the second brake pad.

11. The disc brake of claim 10, wherein, the brake pad guide comprises a guide groove.

12. A method for adjusting an air gap in a disk brake for a motor vehicle, the disk brake comprising a brake caliper, a brake carrier supporting the brake caliper, a brake disk, a first brake pad, a second brake pad, and an electromagnet, the method comprising:

contacting the first brake pad and the second brake pad with the brake disk arranged therebetween; and adjusting an air gap between the brake disk and at least one of the first brake pad and the second brake pad by controlling the electromagnet in a temporally controlled manner.

13. The method as claimed in claim 12, wherein step (b) of adjusting the air gap comprises calibration of the air gap.

14. The method as claimed in claim 13, comprising a step (c) of cleaning the disk brake by control of the electromagnet.

15. The method as claimed in claim 12, comprising a step (c) of cleaning the disk brake by control of the electromagnet.

* * * * *